United States Patent
Milicevic et al.

(10) Patent No.: US 11,117,825 B2
(45) Date of Patent: Sep. 14, 2021

(54) METHOD FOR ACTIVATING AN INNER SURFACE OF A HOLLOW GLASS SUBSTRATE TUBE FOR THE MANUFACTURING OF AN OPTICAL FIBER PREFORM

(71) Applicant: Draka Comteq B.V., Amsterdam (NL)

(72) Inventors: Igor Milicevic, Helmond (NL); Mattheus Jacobus Nicolaas Van Stralen, Tilburg (NL); Johannes Antoon Hartsuiker, Eindhoven (NL)

(73) Assignee: DRAKA COMTEQ B.V., Amsterdam (NL)

( * ) Notice: Subject to any disclaimer, the term of this patent is extended or adjusted under 35 U.S.C. 154(b) by 115 days.

(21) Appl. No.: 14/101,705

(22) Filed: Dec. 10, 2013

(65) Prior Publication Data

US 2014/0157829 A1 Jun. 12, 2014

(30) Foreign Application Priority Data

Dec. 11, 2012 (NL) .................................... 2009962

(51) Int. Cl.
  *C03B 37/018* (2006.01)
(52) U.S. Cl.
  CPC ........ *C03B 37/018* (2013.01); *C03B 37/0183* (2013.01); *C03C 2218/33* (2013.01)
(58) Field of Classification Search
  CPC ........ C03B 37/01231; C03B 37/01861; C03B 37/018; C03C 2218/33
  See application file for complete search history.

(56) References Cited

U.S. PATENT DOCUMENTS

| | | | | |
|---|---|---|---|---|
| 4,049,413 A | * | 9/1977 | French ............... | C03B 37/01228 359/900 |
| 4,428,761 A | * | 1/1984 | Howard ................ | C03B 37/018 65/31 |
| 4,493,721 A | * | 1/1985 | Auwerda et al. ................ | 65/391 |
| 4,793,843 A | * | 12/1988 | Pluijms et al. .................. | 65/397 |
| 4,854,956 A | * | 8/1989 | Pluijms ................... | C03B 29/02 65/391 |
| 5,397,372 A | * | 3/1995 | Partus ................ | C03B 37/01815 65/391 |
| 5,674,625 A | * | 10/1997 | Takahashi ............. | C03C 17/007 428/142 |
| 5,676,724 A | * | 10/1997 | Barre et al. ...................... | 65/382 |
| 6,200,908 B1 | * | 3/2001 | Vandamme ......... | H01L 21/3065 216/59 |
| 6,532,773 B1 | * | 3/2003 | Mazzarese et al. ............ | 65/378 |
| 7,025,831 B1 | * | 4/2006 | Butterbaugh ........... | C03C 15/00 118/715 |
| 8,778,496 B2 | * | 7/2014 | Hart ........................ | C03C 15/00 359/601 |
| 2009/0003787 A1 | * | 1/2009 | Hartsuiker et al. ........... | 385/124 |
| 2009/0004404 A1 | | 1/2009 | Hartsuiker et al. | |
| 2009/0173107 A1 | * | 7/2009 | Hartsuiker .......... | C03B 37/0183 65/391 |
| 2011/0023550 A1 | * | 2/2011 | Hartsuiker et al. ............. | 65/391 |
| 2011/0302966 A1 | * | 12/2011 | Milicevic et al. .............. | 65/391 |
| 2013/0224493 A1 | * | 8/2013 | Gabel .................... | C03B 32/02 428/410 |

FOREIGN PATENT DOCUMENTS

JP 2004238277 A 8/2004

OTHER PUBLICATIONS

Bloebaum and Radley (1995) "Three-dimensional surface analysis of young adult human articular cartilage" J. Anat. 187, pp. 293-301.*

* cited by examiner

*Primary Examiner* — John M Hoffmann

(74) *Attorney, Agent, or Firm* — Shumaker, Loop & Kendrick, LLP

(57) ABSTRACT

A method for activating an inner surface of a hollow glass substrate tube for manufacturing an optical fiber preform including depositing a plurality of activation glass layers on the inner surface of the hollow substrate tube by a PCVD process, wherein a total thickness of the deposited activation glass layers is between 10 microns and 250 microns, and etching the deposited activation glass layers to remove at least 30% of the deposited activation glass layers.

16 Claims, No Drawings

METHOD FOR ACTIVATING AN INNER SURFACE OF A HOLLOW GLASS SUBSTRATE TUBE FOR THE MANUFACTURING OF AN OPTICAL FIBER PREFORM

TECHNICAL FIELD AND BACKGROUND OF THE INVENTION

The present invention relates to a method for activating an inner surface of a hollow glass substrate tube for the manufacturing of an optical fiber preform.

One method for manufacturing optical fibers includes depositing multiple thin films or layers of glass (e.g. glass layers) on the inside surface of a hollow substrate tube. Subsequently, the substrate tube is collapsed to form a core-rod, which is optionally sleeved or overcladded to form an optical fiber preform from which optical fibers may be drawn.

The glass layers are applied on the inside of the substrate tube by means of introducing glass-forming gases (e.g., doped or undoped reactive gases) into the interior of the substrate tube from one end (i.e., the supply side of the substrate tube). Doped or undoped glass layers are deposited onto the interior surface of the substrate tube. The gases are discharged or removed from the other end of the substrate tube (i.e., the discharge side of the substrate tube), optionally by the use of a vacuum pump. A vacuum pump has the effect of generating a reduced pressure within the interior of the substrate tube.

During a PCVD (plasma chemical vapour deposition) process, a localized plasma is generated. Generally, microwaves from a microwave generator are directed toward an applicator via a waveguide. The applicator, which surrounds the glass substrate tube, couples the high frequency energy into the plasma. In addition, the applicator and the substrate tube are generally surrounded by a furnace so as to maintain the substrate tube at a temperature of 900-1300° C. during the deposition process. The applicator (and hence the plasma it forms) is moved reciprocally in the substrate tube's longitudinal direction. A thin glass layer is deposited onto the interior surface of the substrate tube with every stroke or pass of the applicator.

Thus, the applicator is moved in translation over the length of the substrate tube within the boundaries of a surrounding furnace. With this translational movement of the applicator, the plasma also moves in the same direction. As the applicator reaches the furnace's inner wall near one end of the substrate tube, the movement of the applicator is reversed (the "reversal point") so that it moves to the other end of the substrate tube toward the furnace's other inner wall (another "reversal point"). The applicator, and thus the plasma, travel in a back-and-forth movement along the length of the substrate tube. Each reciprocating movement is call a "pass" or "stroke." With each pass, a thin layer of glass is deposited on the interior surface of the substrate tube.

Normally, a plasma is generated only in a part of the substrate tube (e.g., the part that is surrounded by the microwave applicator). Typically, the dimensions of the microwave applicator are smaller than the respective dimensions of the furnace and the substrate tube. Only at the position of the plasma are the reactive gases converted into solid glass and deposited on the inside surface of the substrate tube. The passes increase the cumulative thickness of these thin films (i.e., the deposited material), which decreases the remaining internal diameter of the substrate tube. In other words, the hollow space inside the substrate tube gets progressively smaller with each pass.

This plasma causes the reaction of the glass-forming gases (e.g. $O_2$, $SiCl_4$ and e.g. dopant gas $GeCl_2$ or other gases) that are supplied to the inside of the substrate tube. The reaction of the glass-forming gases allows reaction of Si (Silicon), O (Oxygen) and e.g. the dopant Ge (Germanium) so as to thus effect direct deposition of, for example, Ge-doped SiOx on the inner surface of the substrate tube.

When the deposition is complete, the substrate tube is thermally collapsed into a massive core-rod. The core-rod can optionally be externally coated with an additional glass layer, for example by applying silica by means of an outside deposition process, or by placing the preform rod in a so-called "jacket tube" (or "sleeve"), comprised of undoped silica, prior to the optical fibre drawing procedure, so as to thus increase the amount of undoped silica relative to the amount of doped silica in the final fibre. An optical fibre preform is thus obtained. If an extremity of the preform is heated so that it becomes molten, a thin glass fibre can be drawn from the rod and be wound on a reel; the optical fibre then has a core portion and a cladding portion with relative dimensions and refractive indexes corresponding to those of the preform. The fibre can function as a waveguide, for example, for use in propagating optical telecommunication signals.

It should be noted that the glass-forming gases flushed through the substrate tube may also contain other components. The addition of a dopant such as $C_2F_6$ to the glass-forming gases will lead to a reduction in the refractive index value of the silica.

The use of an optical fibre for telecommunication purposes requires that the optical fibre be substantially free from defects (for example discrepancies in the percentage of dopants, undesirable cross-sectional ellipticity, and the like), because, when considered over a large length of the optical fibre, such defects may cause a significant attenuation of the signal being transported. It is important, therefore, to realize a uniform and reproducible PCVD process, because the quality of the deposited PCVD layers will contribute to the quality of the fibres.

In order to have a good initial glass layer attachment on the interior wall of the substrate tube, and to prevent the formation of bubbles in the initial glass deposited layers, preform manufacturers pre-treat the inside of the hollow substrate tube before the deposition process starts. This is referred to as "plasma polishing" or the "plasma etching" phase. Hence, generally, before starting the deposition of glass layers inside the substrate tube, the inner surface of the initial substrate tube is pretreated or activated for achieving good adhesion and/or for preventing unwanted effects from pollutions that are present in the starting glass material of the substrate tube. This pretreatment or activation is generally carried out by means of etching. This etching is generally carried out by reciprocating a plasma in the substrate tube while flowing an etching gas, for example Freon ($C_2F_6$) and optionally a carrier gas, such as oxygen ($O_2$), through the substrate tube. Such a treatment etches away glass material from the inside of the substrate tube. It should be noted that when Freon is used in a gas mixture with glass-forming gases, the Fluorine from the Freon is built in the deposited glass layers. In such a case Freon will not function as an etching gas.

The present inventors found that such an inside etching treatment, the inside surface of the substrate tube is not uniformly etched, i.e. serious differences in the amount of material being etched away exists at different radial and/or longitudinal positions. The present inventors have found that this non-uniform etching is caused by preferential etching in the substrate tube that can vary between substrate tubes (batches).

Without wishing to be bound to a particular theory, it is suggested by the present inventors that there is a material inhomogeneity within the inner surface of the substrate tube, and that some parts are etched to a greater extent than other parts. The preferential etching will give rise to local disturbances in the glass deposited in the subsequent PCVD process forming said optical fiber preform. These local disturbances can take the form of small indentations or holes. One effect of this uneven etching process is that the roughness of the inside surface of the hollow substrate tube will be increased. In other words, the indentations or holes are increased.

As described above, such local disturbances are undesirable since they lead to a decreased, quality of the optical fibers produced. This is due in part to the fact that if the initial surface of the substrate tube has irregularities before deposition, the deposition of glass layers will amplify the initial roughness. It has been observed by the present inventors that when a prior art activation step of etching the substrate tube is carried out, the indentations on the inside of the glass tube will lead to the formation of droplets or protrusions in the glass layers that are subsequently deposited.

Due to this phenomenon, in the process of inside vapour deposition of glass layers, when the amount of deposited glass material increases, this initial roughness will create disturbances in the end product, i.e. an optical waveguide. This is especially severe for a multimode optical fibre because the refractive index profile will also be modified, resulting in a degradation of quality, i.e. uniform optical properties. Deviations from the desired refractive index in the longitudinal direction have been observed with prior art activation methods. In other words, the refractive index is not stable in the longitudinal direction, which is undesirable.

Several publications in the patent literature are concerned with this aspect.

EP 2 008 978 A1 relates to a method for the deposition of glass layers on the inner surface of the hollow substrate tube in which the deposition of glass layers is interrupted by carrying out an intermediate step, which intermediate step comprises supplying a fluorine-containing etching gas into the hollow substrate tube. This intermediate step removes deposited soot outside of the glass deposition area, i.e. soot deposited outside of the plasma zone. This application relates to an etching process in a small part of the substrate tube.

U.S. Pat. No. 4,493,721 relates to a method of manufacturing optical fibres in which method the inner surface of a substrate tube is etched with a fluorine compound before the actual deposition process is started. After the etching step, the first layers of glass are deposited.

JP62021724A relates to a method of polishing the inner surface of a glass tube though a plasma flame generated in the glass tube.

Another method of etching via washing the interior of a hollow substrate tube with hydrofluoric acid, which is a highly hazardous material, is environmentally unsafe and therefore undesirable.

SUMMARY OF THE INVENTION

An object of the invention is to provide a method for activating the inner surface of a substrate tube that does not induce an increase in inner surface irregularities.

Another object of the invention is to provide a method for manufacturing a preform for optical fibres by means of an inside vapour deposition process in which the formation of bubbles in the glass layers is reduced to a minimum.

Another object of the invention is to provide a method for manufacturing a preform for optical fibres by means of an inside vapour deposition process in which the initial glass layer attachment to the interior of the hollow substrate tube is such that the formation of cracks in the glass layers thus deposited are reduced to a minimum.

Another object of the present invention is to provide a method for manufacturing a preform for optical fibres by means of an inside vapour deposition process in which the roughness of the interior of the hollow substrate tube is not substantially increased after carrying out an etching step.

Another object of the present invention is to provide a method for manufacturing a preform for optical fibres by means of an inside vapour deposition process in which the roughness of the inner surface of the starting hollow substrate tube is such that no glass layer forming disturbing irregularities are present.

The present invention provides pretreatment or activation methods that improve the "smoothness" (i.e., decrease the surface roughness) of the inner surface of a substrate tube such that the homogeneity of subsequently deposited glass layers is improved or increased.

In one embodiment, a method for activating an inner surface of a hollow glass substrate tube for manufacturing an optical fiber preform is provided herein, including the steps of:

i) depositing a plurality of activation glass layers on the inner surface of the hollow substrate tube by a PCVD process, wherein a total thickness of the deposited activation glass layers is between 10 microns and 250 microns; and ii) etching the deposited activation glass layers to remove at least 30% of the deposited activation glass layers.

In a further embodiment, the etching process includes plasma etching using an etching gas.

In a further embodiment, the etching has is a fluorine-containing etching gas.

In a further embodiment, the etching gas includes a hydrogen-free fluorinated compound and a carrier gas.

In a further embodiment, the etching gas is selected from the group consisting of $CCl_2F_2$, $CF_4$, $C_2F_6$, $SF_6$, $F_2$, $SO_2F_2$, and a combination thereof.

In a further embodiment, the carrier gas is selected from the group consisting of oxygen ($O_2$), nitrogen ($N_2$), and argon (Ar).

In a further embodiment, the fluorine-containing etching gas is a mixture including at least $O_2$ and $C_2F_6$ and/or $SF_6$.

In a further embodiment, undoped glass-forming gases are used in the PCVD process of step i).

In a further embodiment, the undoped glass-forming gases include a mixture of at least $O_2$ and $SiCl_4$.

In a further embodiment, the thickness of the deposited activation glass layers is at least 25 micrometers, alternatively at least 50 micrometers, and at most 125 micrometers, alternatively at most 75 micrometers.

In a further embodiment, at least 40% of the deposited activation glass layers are removed during the etching step ii), alternatively at least 50%, and at most 100%, alternatively at most 99%, at most 95%, at most 90%, or at most 80%.

In a further embodiment, the activation glass deposition during step i) is carried out along the entire length of the substrate tube, alternatively along at least 80%, 90%, or 95% of the length of the hollow substrate tube.

DETAILED DESCRIPTION OF THE INVENTION

The term "activating" as used herein with reference to the hollow substrate tube means pretreatment of a hollow substrate tube before starting the deposition process—generally before starting a conventional CVD (chemical vapor deposition) process inside of the hollow substrate tube. The activation takes place on the initial or original or virgin surface of the substrate tube. It should be noted that during the activation according to the invention, a plurality of activation layers are deposited. Only the first activation layer has direct contact with the starting or original or virgin surface of the substrate tube, but the complete process of deposition of a plurality of activation layers is considered to be "activating."

The term "inner surface" as used herein means the inside or interior surface of the hollow substrate tube.

The term "hollow substrate tube" as used herein means an elongated tube having a cavity within; generally, the inside of the tube is provided (or coated) with a plurality of glass layers during the manufacturing of a preform.

The term "the length of the hollow substrate tube" as used herein means the effective length of the total hollow substrate tube, being the length of the substrate tube in which a plasma may by generated and in which deposition of glass may occur.

The term "cavity" as used herein means the space surrounded by the wall of the substrate tube.

The terms "glass" or "glass material" as used herein means crystalline or vitreous (glassy) oxide material—e.g. silica ($SiO_2$) or quartz—deposited by means of a vapour deposition process.

The term "silica" as used herein means any substance in the form of $SiO_x$, whether or not stoichiometric, and whether or not crystalline or amorphous.

The term "activation glass layers" as used herein means layers of glass material that are used to activate the inner surface of the hollow substrate tube. A plurality of activation layers are deposited. Only the first activation layer has direct contact with the inner surface of the substrate tube, but all layers deposited during step i) are considered to be activation layers.

The term "etching process" as used herein means a process of removing glass materials through chemical action.

The term "etching gas" as used herein means a gaseous etching compound used during the etching process; an etching gas is a gas, which under the appropriate conditions (e.g., temperature and concentration) is capable of removing glass materials through chemical action.

The term "plasma etching" as used herein means an etching process in which the etching conditions for an etching gas are created or improved in a plasma.

The term "fluorine-containing etching gas" as used herein means an etching gas containing fluorine and/or one or more fluorinated compounds.

The term "fluorinated compound" as used herein means a compound including at least one bound fluorine atom, e.g. a fluorinated hydrocarbon.

The term "hydrogen-free fluorinated compound" as used herein means a per-fluorinated compound; a fluorinated compound in which no hydrogen atoms are present, e.g. a fluorinated hydrocarbon wherein all hydrogen atoms have been replaced by fluorine atoms.

The term "carrier gas" as used herein means a gas that dilutes the concentration of etching gas, without reacting directly with the etching gas.

The term "glass-forming gases" as used herein means reactive gases used during the deposition process to form glass layers.

The term "undoped glass-forming gases" as used herein means gasses without intentionally added dopants that are able to react to essentially pure silica glass.

The term "extent of removal of the activation glass layers" as used herein means the percentage of the deposited activation glass layers removed; this can be calculated, for example, by the difference in thickness of the total number of activation glass layers before and after removal, or calculated by the weight of the glass deposited and the glass removed.

In another embodiment, provided herein is a method of activating a hollow glass substrate tube used for the manufacture of an optical fiber preform. A thin layer of glass in the form of several activation glass layers is deposited and subsequently partially or fully removed by etching.

The etching step, required to obtain good adhesion of the subsequently deposited glass layers, has some negative side effects. The substrate tube as supplied (i.e. the original substrate tube) can, for example, be non-homogenous in composition. This inhomogeneity leads to a preferential etching, i.e., etching of materials having a different effect on different parts of the inner surface of the substrate tube.

In other words, the etching is inhomogeneous (i.e., non-uniform) over the inner surface of the substrate tube. This inhomogeneity causes severe problems during the deposition steps. The present inventors have found that by carrying out the etching step on PCVD deposited layers instead of on the initial substrate tube itself, the benefits of the etching process (i.e., the improved adhesion) is retained whereas the negative side effects of the etching (e.g., the creation of surface inhomogeneity) is diminished or eliminated.

The present inventors assume that when PCVD deposited activation glass layers are etched away, the inner surface of the substrate tube obtained is much more smooth and uniform than the initial (i.e. original or virgin) surface of a substrate before the deposition of the preliminary glass layers and the etching thereof.

According to the present method, the formation of activation (or preliminary) glass layers is a first process step, and the deposition of these activation glass layers takes place before the actual deposition process takes place.

These activation glass layers are removed (e.g., partially or fully) from the interior of the hollow substrate tube by an etching step. After the partial or full removal of these activation glass layers, the actual deposition process of glass layers takes place, i.e. the formation of inside glass layers resulting in a preform having a specific refractive index profile. The activation glass layers do not contribute to the desired refractive index profile. The activation glass layers are partially or fully removed before the actual deposition process takes place. A function of the removal of these activation glass layers is to create an inner substrate tube surface that is smooth, without unwanted irregularities and disturbances and suitable as a surface for the subsequent deposition of glass layers for the creation of the desired specific refractive index profile.

Step i) of the method described herein may include:

a) providing a hollow glass substrate tube having an inner surface;

b) heating the hollow substrate tube to a temperature of at least 1000° C.;

c) supplying one or more glass-forming gases into the interior of the hollow substrate tube;

d) depositing a predetermined number of activation glass layers on the inner surface of the hollow substrate tube; and e) terminating the supply of glass-forming gases into the hollow substrate tube.

Generally, the hollow substrate tube has a supply side and a discharge side. The hollow substrate tube can be considered to include a wall (e.g., cylindrical wall) enclosing a cavity. The hollow substrate tube has outer surface (i.e., outside of the wall) and an inner surface (i.e., inside of the wall). The inner surface is in contact with the cavity. In a specific embodiment, the hollow substrate tube is cylindrical in shape and defines a cylindrical cavity.

Generally, the one or more glass-forming gases are introduced into the hollow substrate tube via the supply side thereof. The gases are introduced into the cavity of the hollow substrate tube. The wall thickness of the hollow substrate increases in relation to the number and thickness of the activation glass layers deposited. Consequently, the cavity decreases in diameter as the number of glass layers deposited increases. The decrease in diameter is related to the number and thickness of the number of activation glass layers deposited. The deposition generally takes place by creating predetermined temperature conditions in at least a part of the hollow substrate tube. Preferably, a reaction zone (or plasma zone) is present inside of the hollow substrate tube. The reaction zone is defined as a zone or part in which the deposition of glass takes place. In other words, in the reaction zone, temperature conditions suitable for the deposition of glass layers are created. Preferably, the reaction zone has the length of only part of the length hollow substrate tube. In this case, in order to obtain glass deposition along the whole length of the hollow substrate tube, the reaction zone moves, preferably back and forth, along the longitudinal axis of the hollow substrate tube. Preferably, the reaction zones moves back and forth between a reversal point near the supply side and a reversal point near the discharge side of the hollow substrate tube.

"Terminating" as used herein means stopping or halting the supply of the glass-forming gases to the inside of the hollow substrate tube, which stops the deposition process. In other words, step e) above means terminating the deposition of the activation glass layers.

The etching process of step ii) described above includes supplying an etching gas (or etching gases) into the hollow substrate tube. The etching gas(es) reacts with the deposited activation glass layers to remove a portion or all of the activation glass layers deposited in step i).

The etching step includes passing a gaseous etching compound through the inside of the hollow substrate tube, preferably via the supply side thereof. This step ensures removal of at least a part of or all of the activation glass layers previously deposited. The removal is carried out by means of etching. The etching leaves behind an "activated" inner surface of the hollow substrate tube.

In a further embodiment, provided herein is a method of manufacturing a preform for optical fibers by means of an inside vapor deposition process, including the steps of:

providing a hollow substrate tube having an activated inner surface;

supplying doped and/or undoped glass-forming gases into the hollow substrate tube having an activated inner surface;

depositing glass layers on the inside of the hollow substrate tube; and collapsing or consolidating the substrate tube into an optical fibre preform;

wherein the activated inner surface is activated by the method including the steps of:

i) depositing a plurality of activation glass layers on the inner surface of the hollow substrate tube by a PCVD process, wherein a total thickness of the deposited activation glass layers is from 10-250 micrometers; and ii) etching the deposited activation glass layers to remove at least 30% of the deposited activation glass layers.

In one embodiment, a fluorine-containing etching gas is used. In another embodiment, the fluorine-containing etching gas includes a hydrogen-free fluorocarbon and a carrier gas such that the absence of hydrogen atoms prevents the introduction of hydroxyl-groups during the deposition process, which cause increased attenuation.

The etching gas is preferably selected from the group consisting of $CCl_2F_2$, $CF_4$, $C_2F_6$, $SF_6$, $F_2$ and $SO_2F_2$, and a combination thereof. Preferably, the etching gas is used in the presence of a carrier gas, such as oxygen, nitrogen, or argon.

When a fluorocarbon compound (fluorinated carbon compound) is used as the etching gas, the deposition of elemental carbon may take place. Without wishing to be bound by a theory, the fluorine atoms of the etching gas etch and the carbon atoms of the etching gas are deposited on the inside surface of the substrate tube. In some cases, a black film may be formed. The use of oxygen ($O_2$) as a carrier gas may be used when a fluorocarbon compound is used, as the oxygen reacts with the carbon of the etching gas to prevent carbon (C) deposition.

Examples of suitable etching gases include, but are not limited to, $CF_4$, $SF_6$, $NF_3$, $C_2F_6$, $C_4F_8$, $CHF_3$, $CClF_3$, $CCl_2F_2$, $CCl_3F$, $SiF_4$, and combinations thereof. The first etching gas may be selected from the group consisting of $CF_4$, $SF_6$, $NF_3$, $C_2F_6$, $C_4F_8$, $CHF_3$, $SiF_4$, and combinations thereof.

The concentration of the etching gas and the temperature at which the gas flows across the surface of the oxide material present on the interior of the hollow substrate tube affects the rate of removal of the deposited oxide material and/or contaminated region by the etching gas. The combination of the temperature and etching gas concentration are sufficient to allow for a rapid etching rate (removal rate) of the deposited oxide material, which optimally results in decreasing the processing time of the substrate tube. The temperature of the etching step may be less than about 1300° C., more preferably less than about 1250° C., and most preferably less than about 1200° C.

With rapid removal rates, the fluorine tends to diffuse into the remaining deposited oxide material more rapidly than the oxide material can be removed through etching. This creates a contamination layer in the deposited oxide material of fluorine, which in turn changes the refractive index of the remaining oxide material, and therefore the resultant preform, and ultimately of the optical fibre drawn from this material. The contamination layer should therefore be removed during the etching step.

In one embodiment, the fluorine-containing etching gas is a combination of $C_2F_6$ and $O_2$.

Undoped glass-forming gases are preferably used in step i) such that the glass layers thus deposited do not influence the final optical properties of the drawn fibres. Further, preliminary glass layers formed on basis of undoped glass-forming gases can easily be removed by the etching step. One example of undoped glass-forming gases includes a mixture of $SiCl_4$ and $O_2$.

The activation layers preferably have a total minimum thickness of at least 10 micrometers (i.e., microns), preferably at least 25 micrometers, more preferably at least 50 micrometers. The minimal thickness ensures the benefits from the etching process. Etching should hence preferably be carried out over a thickness of at least 10 micrometers to have sufficient effect.

The activation layers have a maximal total thickness of at most 250 micrometers, preferably at most 125 micrometers, more preferably at most 75 micrometers.

The deposited activation layers are partially or fully etched away in step ii) without etching the underlying substrate tube itself. The activation layers as deposited in step i) are removed to an extent of at least 30%, preferably to an extent of at least 40%, and more preferably to an extent of at least 50%.

In another embodiment, the activation glass layers deposited in step i) are removed to an extent of at most 100%, alternatively at most 99%, alternatively at most 95%, alternatively at most 90%, alternatively at most 85%, and alternatively at most 80%.

The activation layers may thus be fully etched away, however, care should be taken that the substrate tube is not etched or otherwise affected.

In applications in which some of the deposited activation layers remain after etching, the remaining activation layers are undoped and therefore do not affect the final refractive index profile.

During the deposition of the activation glass layers, the reaction zone is preferably reciprocated (i.e., moved back and forth) between a reversal point near the supply side and a reversal point near the discharge side of the hollow substrate tube. This reciprocating movement results in a homogenous reaction zone for the deposition of the predetermined number of activation glass layers which, for example, results in uniform thickness along the length of the deposited activation layers.

The reaction zone is preferably a plasma generator, wherein the plasma power may be set to a value between 1 and 10 kW, so that in particular, melting of the substrate tube is prevented.

WORKING EXAMPLES

Example 1

A hollow substrate tube made of quartz was manufactured by means of a standard PCVD process as known from Dutch patent NL 1 023 438 in the name of the present applicant.

A hollow substrate tube having a supply side and a discharge side was placed in a furnace, in which furnace an applicator is present, which applicator can move back and forth along the length of the hollow substrate tube within the furnace. Microwave energy was supplied to the applicator via a waveguide so as to create plasma conditions in the interior of the hollow substrate tube, which plasma conditions function to deposit glass layers on the interior of the hollow substrate tube. The plasma generated by the applicator may be present slightly outside the area surrounded by the applicator.

The hollow quartz substrate tube was heated to a temperature of 1120° C. and the deposition of preliminary glass layers was initiated by supplying a mixture of $SiCl_4$ and $O_2$ to the supply side of the substrate tube. The heating phase lasted for 3-10 minutes.

After sufficiently heating the substrate tube, undoped silica layers were deposited at a rate of 2.5 grams per minute. During the deposition, the full pass length of the applicator was used, i.e., the applicator travelled back and forth along the length of the hollow substrate tube within the furnace. The deposition of undoped preliminary glass layers was carried out for approximately 5 minutes. The total amount of deposited material was around 12.5 grams with a thickness of about 100 microns.

After the undoped preliminary glass layers were deposited (i.e., the activation layers), the deposited activation layers were etched by supplying a fluorine-containing etching gas including a combination of $C_2F_6$ and $O_2$ to the interior of the hollow substrate tube.

During the etching step, the deposited preliminary glass layers (i.e., activation layers) were removed to an extent of 90% from the inner surface of the tube. The duration of the etching phase was about 9 minutes, and resulted in the inner surface of the substrate tube being sufficiently activated and prepared for the further deposition of the glass layers for creating the desired specific refractive index profile.

After the etching phase was complete, a standard PCVD deposition process was carried out by moving the plasma back and forth along the length of the hollow substrate tube at a velocity of 20 m/min, wherein the hollow substrate tube was positioned in the interior of a furnace. The furnace was set to a temperature of 1000° C., using a plasma power of 9 kW. The deposition rate of glass layers on the interior of the hollow substrate tube was 3.1 g/min, based on $SiO_2$, with the pressure inside the hollow substrate tube amounting to about 10 mbar. A gas composition consisting of $O_2$, $SiCl_4$, $GeCl_4$ and $C_2F_6$ was supplied to the interior of the hollow substrate tube. The substrate tube thus obtained was ready for collapsing into a solid preform.

Example 2

Example 2 differed from Example 1 above in that during the etching step the deposited preliminary glass layers (i.e., activation layers) were removed to an extent of 45% from the inner surface of the tube. The duration of the etching phase was about 4.5 minutes. The total time required for activation was thus reduced, so that the output of core rods was increased.

Core rods produced according to Example 1 and Example 2 were found to contain fewer bubbles, cracks or other inhomogeneity than core rods produced with substrate tubes that underwent plasma etching according to the prior art (i.e., etching the substrate tube itself). When core rods are produced for multimode optical fibers according the methods of the present invention, the resulting multimode fibers contained less disturbances or deviations from the ideal profile than optical fibers obtained from core rods produced with substrate tubes that have undergone plasma etching according to the prior art (i.e., plasma etching of the substrate tube itself). Therefore, the methods provided herein result in a higher yield for high-end multimode fibers such as OM-3 or OM-4 multimode fibers.

What is claimed is:

1. A method of manufacturing a preform for optical fibers comprising the steps of:
    (i) providing a hollow substrate tube having an initial or original inner surface, the initial or original inner surface having surface irregularities that predispose the hollow substrate tube to preferential plasma etching, wherein the surface irregularities of the initial or original inner surface of the hollow substrate tube of step (i) that predispose the hollow substrate tube of step (i) to preferential plasma etching comprise a material inhomogeneity relative to other portions of the hollow substrate tube of step (i);

(ii) depositing directly on the initial or original inner surface of the hollow substrate tube a first activation glass layer with PCVD and subsequently depositing a plurality of activation glass layers directly on the first activation glass layer deposited on the initial or original inner surface of the hollow substrate tube with PCVD thereby forming a pretreated hollow glass substrate tube, wherein a total thickness of all activation glass layers deposited in the pretreated hollow substrate tube is at least 10 microns and up to 250 microns and all of the activation glass layers are undoped;

(iii) after step (ii), etching the pretreated hollow substrate tube thereby removing at least 30% of and up to 100% of the activation glass layers thereby forming an etched hollow substrate tube having an inner surface with reduced surface irregularities or without surface irregularities when compared with the surface irregularities of the initial or original inner surface of the hollow substrate tube of step (i);

(iv) after step (iii), supplying doped glass forming gases, undoped glass-forming gases, or a combination thereof into the etched hollow substrate tube and depositing glass layers from the doped glass forming gases, undoped glass-forming gases, or the combination thereof on the inside of the etched hollow substrate tube; and (v) collapsing the etched hollow substrate tube of step (iv) having deposited glass layers from the doped glass forming gases, undoped glass-forming gases, or the combination thereof on the inside of the etched hollow substrate tube into an optical fiber preform, wherein:

the plurality of activation layers do not contribute to a refractive index profile of the optical fiber preform, and the doped glass forming gases, undoped glass-forming gases, or a combination thereof of step (iv) provide the refractive index profile of the optical fiber preform.

2. The method according to claim 1, wherein the etching in step iii) comprises a plasma etching step using an etching gas.

3. The method according to claim 2, wherein the etching step in step iii) further comprises providing a carrier gas with the etching gas, and
the etching gas is a fluorine-containing etching gas comprising a hydrogen-free fluorinated compound, $F_2$, or a combination thereof.

4. The method according to claim 3, wherein the carrier gas is selected from the group consisting of oxygen, nitrogen, and argon.

5. The method according to claim 3, wherein the fluorine-containing etching gas is one or more of $C_2F_6$ and $SF_6$ and the carrier gas is $O_2$.

6. The method according to claim 2, wherein the etching gas includes at least one etching compound selected from the group consisting of $CCl_2F_2$, $CF_4$, $C_2F_6$, $SF_6$, and $SO_2F_2$, and combinations thereof.

7. The method according to claim 1, wherein the total thickness of the deposited activation glass layers is at least 25 microns.

8. The method according to claim 1, wherein the total thickness of the deposited activation glass layers is at least 50 microns.

9. The method according to claim 1, wherein the total thickness of the deposited activation glass layers is at most 125 microns.

10. The method according to claim 1, wherein the total thickness of the deposited activation glass layers is at most 75 microns.

11. The method according to claim 1, wherein the plurality of activation layers is undoped.

12. The method of claim 1, wherein up to 80% of the activation glass layers are removed during step (iii).

13. The method of claim 1, wherein up to 85% of the activation glass layers are removed during step (iii).

14. The method of claim 1, wherein up to 90% of the activation glass layers are removed during step (iii).

15. The method of claim 1, wherein up to 95% of the activation glass layers are removed during step (iii).

16. The method of claim 1, wherein up to 99% of the activation glass layers are removed during step (iii).

* * * * *